(12) United States Patent
Pivinski

(10) Patent No.: US 6,583,368 B2
(45) Date of Patent: Jun. 24, 2003

(54) AYURVEDIC SCALE

(76) Inventor: Daniel K Pivinski, 6222 Main St., Voorhees, NJ (US) 08043

( * ) Notice: Subject to any disclaimer, the term of this patent is extended or adjusted under 35 U.S.C. 154(b) by 241 days.

(21) Appl. No.: 09/817,948

(22) Filed: Mar. 27, 2001

(65) Prior Publication Data

US 2002/0139590 A1 Oct. 3, 2002

(51) Int. Cl.⁷ .............................. G01G 1/20; A63F 9/18; A63H 15/06
(52) U.S. Cl. ........................ 177/171; 177/190; 177/246; 446/396; 446/489; 273/161
(58) Field of Search ................................ 177/171, 172, 177/175, 176, 190, 191, 192, 197, 199, 200, 235, 246; 446/396, 489; 248/122.1, 123.11; 273/161

(56) References Cited

U.S. PATENT DOCUMENTS

| | | | | |
|---|---|---|---|---|
| 276,524 A | * | 4/1883 | Crosby | 446/396 |
| 409,191 A | * | 8/1889 | Glover | 177/171 |
| 546,299 A | * | 9/1895 | Campbell | 273/161 |
| 676,706 A | * | 6/1901 | Trantom | 177/246 |
| 870,888 A | * | 11/1907 | Kanable | 177/246 |
| 1,337,483 A | * | 4/1920 | Romaniello | 446/396 |
| 1,761,210 A | * | 6/1930 | Jaenichen | 177/200 |
| 2,222,364 A | * | 11/1940 | Dillon, Jr. et al. | 273/161 |
| D157,535 S | * | 2/1950 | Quick | 446/396 |
| 3,439,762 A | * | 4/1969 | Appius | 177/235 |
| 3,656,568 A | * | 4/1972 | Hejzlar | 177/200 |
| 3,750,308 A | * | 8/1973 | Nelson | 446/396 |
| 4,421,320 A | * | 12/1983 | Robson | 273/425 |
| 4,543,067 A | * | 9/1985 | Wallen | 273/161 |
| 5,000,276 A | * | 3/1991 | Grill | 273/161 |
| 5,163,647 A | * | 11/1992 | Fader et al. | 446/396 |
| 5,655,777 A | * | 8/1997 | Neading et al. | 473/594 |
| 5,927,989 A | * | 7/1999 | Kung et al. | 177/190 |
| 5,932,303 A | * | 8/1999 | Stern | 446/396 |
| 6,032,615 A | * | 3/2000 | Girard | 446/489 |

* cited by examiner

Primary Examiner—Randy W. Gibson

(57) ABSTRACT

The invention—Ayurvedic Scale—is a machine that physically represents or models the philosophical essence of the ancient science and philosophy of Ayurveda in the form of a tri-armed scale. The Ayurvedic Scale's primary function is to assist users in determining and visually representing their current spiritual state as well as their underlying Ayurvedic body type, which are both helpful in evaluating immediate choices using Ayurvedic philosophy. It also serves to act as a visual model in helping users to more clearly understand the complexities of Ayurveda, to provide a physical reminder of Ayurveda's suggested foci in the user's life, and to act as a decorative model, which reflects the owner's interest in Ayurveda. The invention is meant to embody two of Ayurveda's core foci—simplicity and balance.

1 Claim, 6 Drawing Sheets

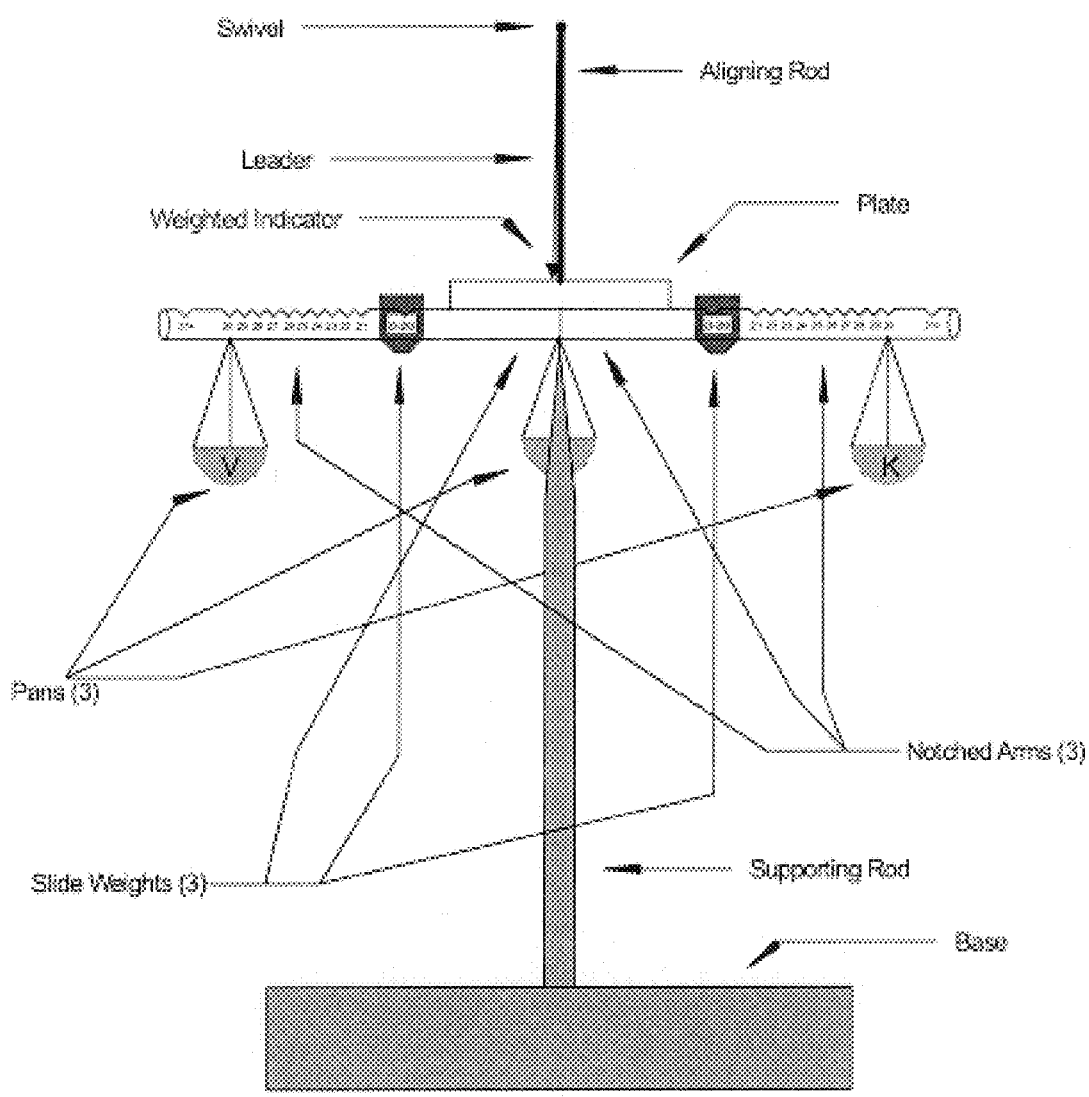

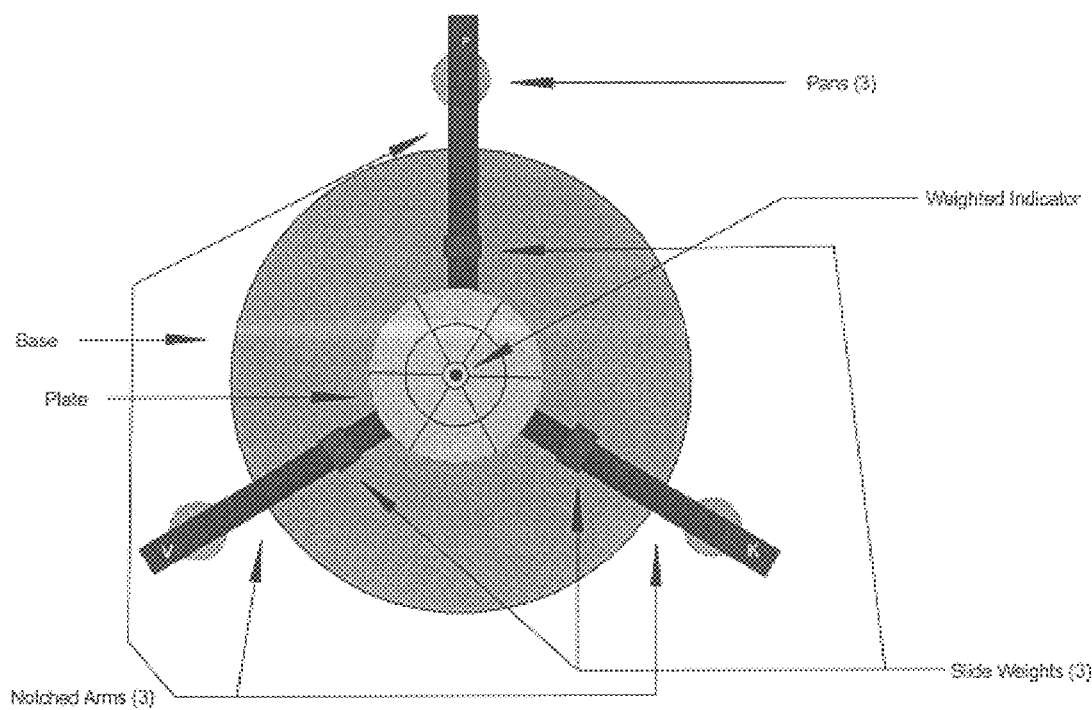

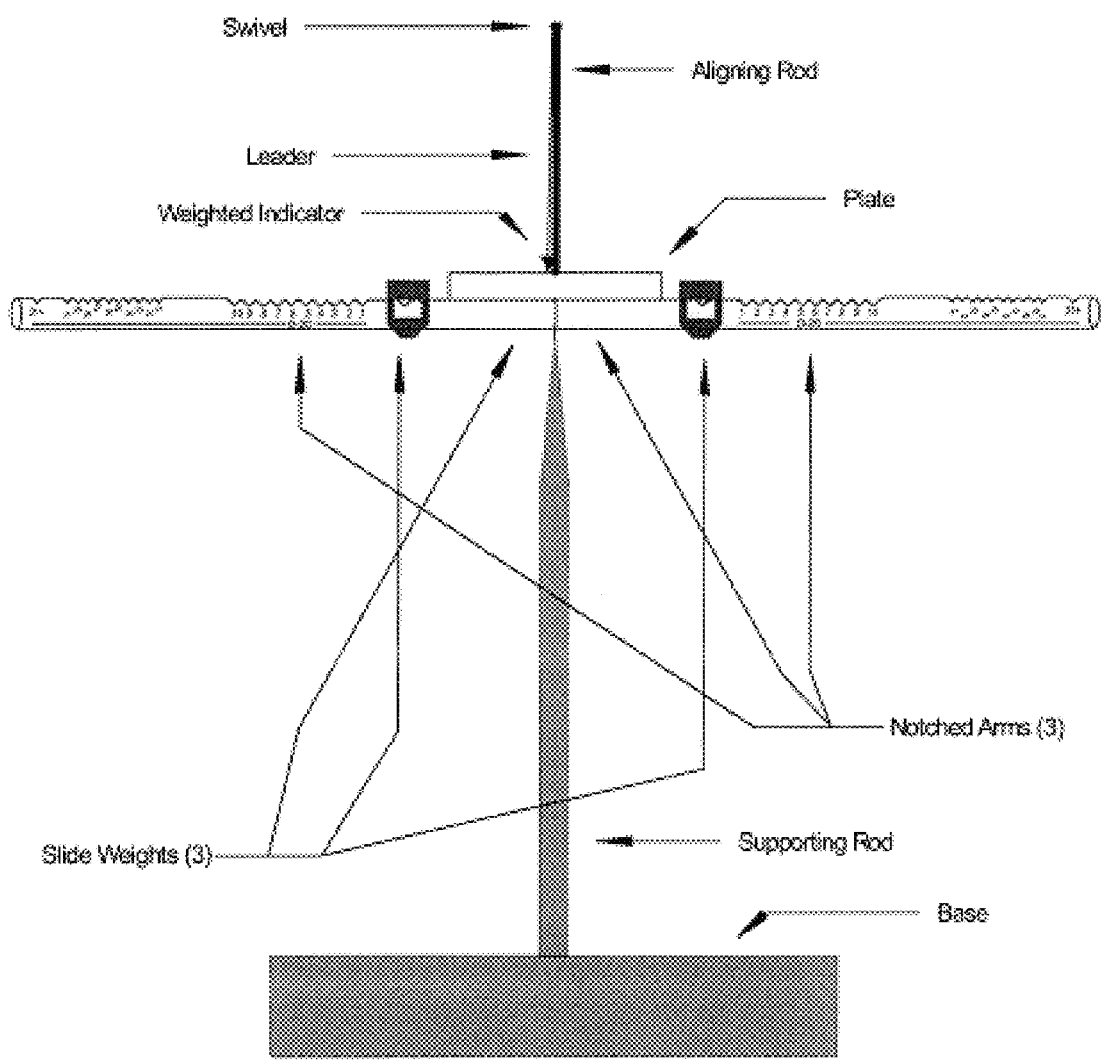

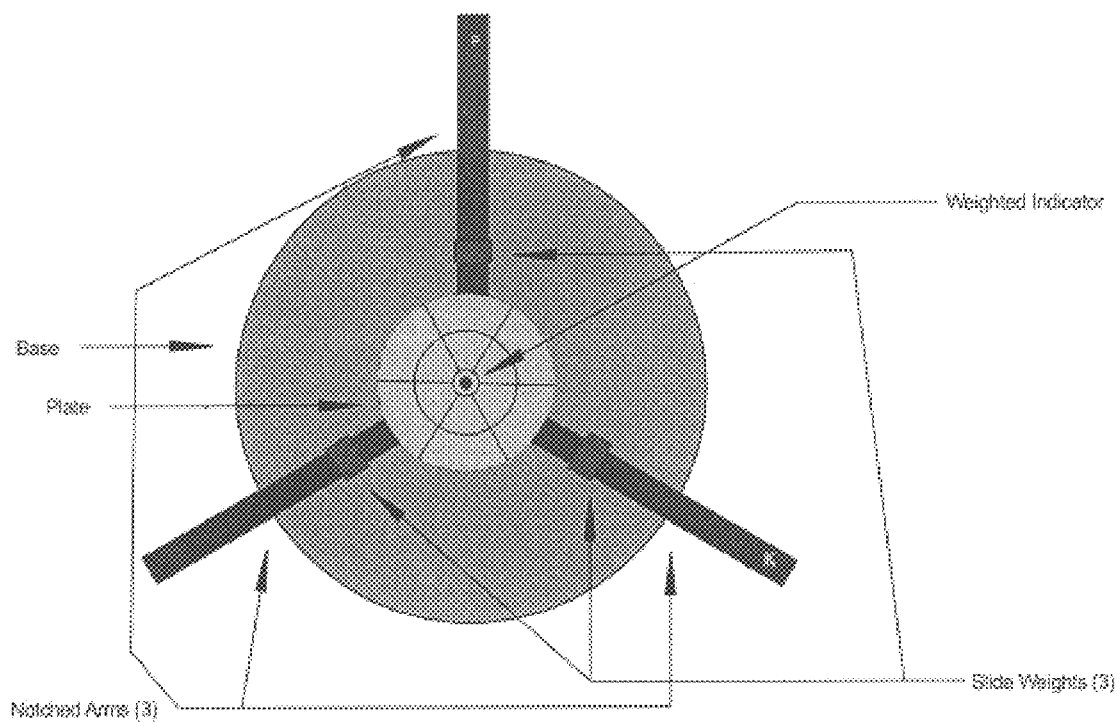

AYURVEDIC SCALE

BACKGROUND OF THE INVENTION

This invention relates generally to the field of Ayurveda, and more particularly to a machine that physical represents or models the philosophical essence of the ancient science and philosophy of Ayurveda in the form of a tri-armed scale.

Rooted in India's ancient scriptures known as the Vedas, Ayurveda is both a science of preventative health and a philosophy of living. At its core is the fundamental belief that all disease is caused by disharmony brought on by violating the fundamental laws of nature, which are reflected in each individual's inner wisdom. Moreover, and as Ayurveda is a proponent of reincarnation of the intellect, mind, and ego, it suggests that we continue to karmatically carry with us unresolved transgressions from previous lifetimes. It labors to remove the underlying cause of disease by seeking the balance that is derived from righting such infractions, and thereby eradicating afflictions at their proverbial roots as well as preventing potential illnesses from ever manifesting. Its primary tool is the proper use of foods and herbs to maintain or restore the body's natural state of balance.

To assist us in making decisions that are in accordance with objective truth relative to our place in the universe, Ayurveda provides guidelines in the form of doshas. The word dosha literally means, "that which has a fault", and refers to the experiential nature of our existence. As Ayurveda recognizes consciousness as the only perfection, it leads us away from even striving for perfection of body, health or life. These unattainable pursuits, it suggests, create burdens on the spirit that necessarily steal vitality from our life force. Instead, Ayurveda advocates a migration towards balance in these areas as a means of aspiring toward the only empowering vision of perfection—pure consciousness.

The doshas help us choose and live wisely by enabling us to clearly recognize our constitutional nature, which is believed to be established at birth and unalterable. They can be practically defined as the organizing forces patterned within our physical body that maintain health and eliminate waste. From the three doshas—Vata, Pitta, and Kapha—the seven body types are formed. When we identify our bodies as composites of Vata, Pitta and Kapha, we are relating to our bodies as syntheses of the very stuff of which the universe is made. Once that correlation is made, there is no longer separation between our bodies and our environment in that we can then witness the elemental forces inside and outside of us. Further, all truth, it is thought, is permanently integrated with knowledge of the conscious self. The fundamental mission in life, it follows, is to understand our individual self before we are able to fully serve the truest nature of our presence—a consciousness that effortlessly recognizes the harmony of our existence with our bodies, others, and our environment.

In keeping with that mission, Ayurveda recommends that each individual honestly assesses his or her own body type and provides a means, visa vi two series of questions, by which to do so. The first series (Section One) is primarily concerned with the individual's physical attributes. Ultimately, this will serve as the foundation for one's body-type assessment. This determination cannot be considered reliable or useful, however, until there is balance in other areas of one's life. Such short-term balance can be appraised by using the second set of questions (Section Two), which focus primarily on recent feelings and actions. For example, someone who actually possesses a Pitta body type may be incorrectly assessed as being a Kapha if significantly out of balance in other areas of his or her life, as quantified by the second series of questions.

If the score on any one section of the second set of questions is significantly high (greater than 20 on the enclosed test), Ayurveda advises accordingly in order to reestablish balance in those areas. After short-term balance is generally achieved, a true assessment of one's body type can then be relied upon by completing the questions regarding physical attributes. Finally, based on one's true body type, Ayurveda promotes continued balance by recommending specific foods and actions that most effectively contribute to that individual's physical, emotional and spiritual well being.

Section One
Vata (Air) Score:
1. I am thin, lanky and slender with prominent joints and thin muscles.
2. 1 am physically light. I may forget to eat or have a tendency to lose weight.
3. My eyes are small and active.
4. My skin is dry, rough or thin.
5. My hair is dry, brittle or frizzy.
6. My joints are thin and prominent and have a tendency to crack.
7. I am a light sleeper with a tendency to awaken easily.
8. My hands and feet are usually cold and I prefer warm environments.
9. I am lively and enthusiastic by nature. I like to change.
10. I become anxious and/or worried when under stress.

Pitta (Fire) Score:
1. I have a medium, symmetrical build with good muscle development.
2. It is easy for me to gain or lose weight if I put my mind to it.
3. I have a penetrating gaze.
4. My skin is warm, reddish in color and prone to irritation.
5. My hair is fine with a tendency towards early thinning or graying.
6. My joints are loose and flexible.
7. I am a moderately sound sleeper, usually needing less than eight hours to feel rested.
8. I am usually warm, regardless of the season, and prefer cooler environments.
9. I am purposeful and intense. I like to convince.
10. I become irritable and/or aggressive when under stress.

Kapha (Earth) Score:
1. I have a large, round or stocky build. My frame is broad, stout or thick.
2. I gain weight easily and have difficulty losing it.
3. I have large pleasant eyes.
4. My skin is thick, moist and smooth.
5. I have abundant, thick and oily hair.
6. My joints are large, well knit and padded.
7. My sleep is deep and long. I tend to awaken slowly in the morning.
8. I am adaptable to most temperatures but do not like cold, wet days.
9. I am easy going and accepting. I like to support.
10. I become withdrawn and/or reclusive.

Section Two
Vata (Air) Score:
1. I have been feeling worried or anxious.
2. I've been having difficult falling asleep or have been awakening easily.
3. I fell restless if I'm not constantly on the move.

4. My digestion is irregular with frequent gas or bloating.
5. My bowel movements are hard, dry or occur less than once per day.
6. My daily schedule of eating meals, going to sleep or awakening often varies from day to day.
7. I tend to be impulsive.
8. 1 often forget things after a short period of time.
9. I have a lot of initiative but have trouble following through.
10. I generally have a number of physical concerns.

Pitta (Fire) Score:
1. I have been feeling irritable or impatient.
2. I tend to be critical and am intolerant of errors.
3. My skin feels hot and irritated, or breaks out easily.
4. I have been having acid indigestion or heartburn.
5. I tend to be compulsive and have difficulty stopping once I've started a project.
6. I am easily frustrated by other people's incompetence.
7. Spicy foods, while I might enjoy them, usually do not agree with me.
8. I am strongly opinionated and tend to share my point of view without being asked.
9. I often feel as if I am overheated or have a low-grade fever.
10. When provoked I can be sarcastic or biting.

Kapha (Earth) Score:
1. I am currently overweight and have difficulty losing extra pounds.
2. I have a slow digestion and feel heavy after eating.
3. I commonly experience sinus congestion or excessive phlegm in my respiratory tract.
4. I have difficulty leaving a relationship, even after it is no linger nourishing.
5. I often deal with conflict by withdrawing.
6. I easily accumulate clutter in my life.
7. I have difficulty getting going in the morning.
8. I like to maintain a routine and resist changing my pace.
9. Given a choice, I prefer to watch rather than participate in an athletic activity.
10. I regularly feel drowsy or sluggish after a meal.

No prior art now exists that attempts to capture Ayurveda's essential philosophy in the form of a tri-armed balance scale.

SUMMARY OF THE INVENTION

The primary object of the invention is to assist users in determining and visually representing their current spiritual/emotional state as well as their underlying Ayurvedic body type, which are both helpful in evaluating their immediate choices using Ayurvedic philosophy.

Another object of the invention is to provide users with a simple, clear method of understanding the complexities of Ayurveda.

Another object of the invention is to provide users with a tangible model of Ayurvedic philosophy to further facilitate their understanding of how to view their lives from an Ayurvedic perspective.

Another object of the invention is to provide users with a tangible, clear, simple method of determining their current spiritual state, their true body type, and what their current focus should be according to Ayurveda.

A further object of the invention is to provide users with a continued physical reminder of Ayurveda's suggested foci in their lives.

Yet another object of the invention is to serve as a decorative model, which reflects the owner's interest in the ancient science and philosophy of Ayurveda.

Other objects and advantages of the present invention will become apparent from the following descriptions, taken in connection with the accompanying drawings, wherein, by way of illustration and example, an embodiment of the present invention is disclosed.

A physical representation or model of the philosophical essence of the ancient science and philosophy of Ayurveda in the form of a tri-armed scale comprising: a three-armed balance scale mechanism, a structure that supports the three armed mechanism at its fulcrum, a measuring system that clearly defines the user's Ayurvedic emotional state and body type, and a weighting system that works in accordance with the measuring system to produce consistent, accurate results.

The drawings constitute a part of this specification and include exemplary embodiments to the invention, which may be embodied in various forms. It is to be understood that in some instances various aspects of the invention may be shown exaggerated or enlarged to facilitate an understanding of the invention.

BRIEF DESCRIPTION OF THE DRAWINGS

FIG. 1A shows the front view of a full model Ayurvedic Scale with both a Slide and Pan type weighting system, which is set to indicate no emotional imbalance (i.e. all three Slide Weights are set to "0–20") and a perfectly balanced Ayurvedic Vata-Pitta-Kapha body type (i.e. an equal number of Pan units of measure are held by each of the three dosha pans).

FIG. 1B shows the top view of a full model Ayurvedic Scale with both a Slide and Pan type weighting system, which is set to indicate no emotional imbalance (i.e. all three Slide Weights are set to "0–20") and a perfectly balanced Ayurvedic Vata-Pitta-Kapha body type (i.e. an equal number of Pan units of measure are held by each of the three dosha pans).

FIG. 2A shows the front view of a full model Ayurvedic Scale with a single Slide type weighting system, which is set to indicate no emotional imbalance (i.e. all three Slide Weights are set to "0–20") and a perfectly balanced Ayurvedic Vata-Pitta-Kapha body type (i.e. an equal score on Section 2 is reflected in each of the three doshas).

FIG. 2B shows the top view of a full model Ayurvedic Scale with a single Slide type weighting system, which is set to indicate no emotional imbalance (i.e. all three Slide Weights are set to "0–20") and a perfectly balanced Ayurvedic Vata-Pitta-Kapha body type (i.e. an equal score on Section 2 is reflected in each of the three doshas).

DETAILED DESCRIPTION OF THE PREFERRED EMBODIMENTS

Detailed descriptions of the preferred embodiment are provided herein. It is to be understood, however, that the present invention may be embodied in various forms.

Figure 3:
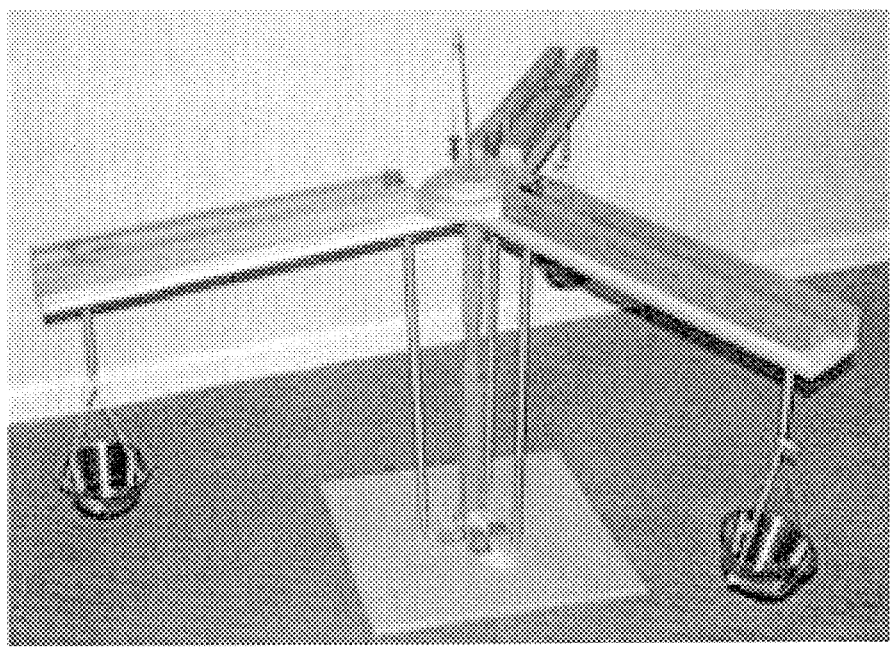
FIG. 3 shows a copy of a photograph of the front view of an actual functional wooden model of an Ayurvedic Scale with a variation of the Slide type weighting system along with a Bin type weighting system and springs attached to each notched arm to facilitate balance and reduce movement volatility.
Figure 4:
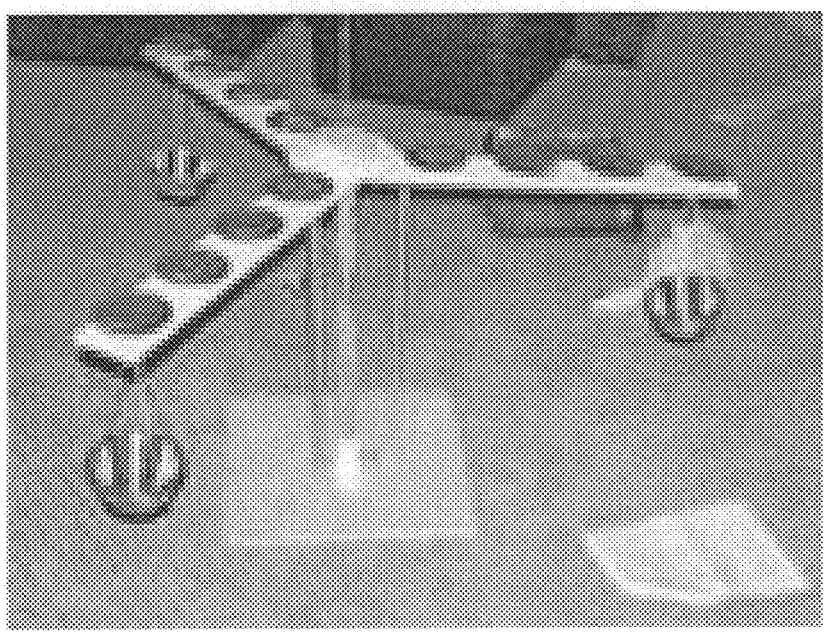
FIG. 4 shows a copy of a photograph of the front view of an actual functional wooden model of an Ayurvedic Scale with two Bin type weighting systems and springs attached to each notched arm to facilitate balance and reduce movement volatility.

Therefore, specific details disclosed herein are not to be interpreted as limiting, but rather as a basis for the claims and as a representative basis for teaching one skilled in the art to employ the present invention in virtually any appropriately detailed system, structure or manner. Examples of this qualification include, but are not limited to the following:

- the Slide-Weighting System can be comprised of hooks, bins, or other fasteners in lieu of a notched bar (ie as in FIG. 4);
- the Pan-Weighting System can be converted to a system similar to that of the aforementioned Slide-Weighting System;
- the weighting systems can be combined to form one weighting system (i.e. a Slide Weighting System as in FIGS. 2A and 2B;
- the basis structure of the scale can be changed from a three-armed deviation of a basic balance scale to a three-armed deviation of virtually any other type of balance scale in existence;
- the measuring device may be altered in shape, construction or concept (i.e. may employ an electronic or other indicator);
- virtually any material (i.e. from sterling sliver to plastic) may be used for construction.

Thus the scope of the invention should be determined by the appended claims and their legal equivalents, rather than by the examples given.

Description of Apparatus

The Ayurvedic Scale consists of three main parts—the structure, weighting system and measuring system. As this device may be built using various materials and in different sizes and configurations, no attempt will be made to specify exact dimensions, unless they are integral to the mechanism and must be consistently applied. Further, all components listed below will be built to scale relative to one another's corresponding purpose, as listed below.

The structure of the scale begins with a base wide enough to support the entire model's weight. A pointed rod protrudes perpendicular from the base and serves to directly support the arms at their fulcrum. The arms consist of three rods of equal length and weight connected at one end and on a common flat or conical plane to form three 120-degree angles (refer to apparatus as a Tri-scale). The connected arms are to be in perfect equilibrium, which is to say that they will be in perfect balance resting on the said supporting rod. Springs or rods may be used to reduce the volatility of arm movement while using the scale or during transport.

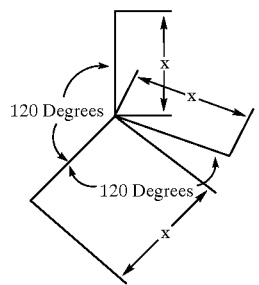

The weighting system consists of two parts. First, three pans are to be either suspended from or attached to the top of the unattached ends of each of the scale's three arms. Each respective pan and/or arm will be designated as either "Vata", "Pitta" or "Kapha". This Pan-Weighting-System's units of measure are to be consistent in weight and in proportion to the secondary weighting system relative to its intended purpose, which will be discussed below. Second, a notched bar will be attached to each of the three arms. Twelve notches will be placed on each bar in positions that correspond with the scale's other components and intended purpose, as discussed below. The notches are to be numbered from fulcrum to end as follows: 0–20, 21, 22, 23, 24, 25, 26, 27, 28, 29, 30, and 31+. A weight will then be attached to each arm and structured so as to fit securely in each notch but loosely enough to move when intentionally manipulated. This will subsequently be referred to as the Slide-Weighting-System.

The measuring system consists, first, of a circular plate secured to the scale so that it and the arm mechanism are concentric. Designated on the plate will be two circles of different sizes, both of which to be concentric with the plate. The plate will also be sectioned from the perimeter of the smaller inner circle to the end of the plate in six segments of equal size and shape. The plate, then, will be divided into thirteen separate sections. An indicating rod will protrude perpendicularly from the center of the plate. A swivel will be attached to the free end of the indicating rod. A lead will be attached to the swivel. A weighted indicator will be attached to the end of the lead. The lead will be long enough so that the indicator at rest suspends slightly higher than the plate, and thus moves freely.

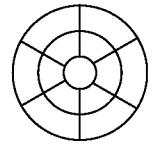

The components of the scale shall be of such weight and length in relation to one another that three measurement results are consistently achieved. First, when the scale is set to reflect immediate emotional balance (i.e. the Sliding-Weighting-System is set to 0–20 on each arm), the Pan-Weighting-System will offset the indicating rod from its balanced state of true north (now indicated by the lead) causing the pointer to rest within the second circle, even when the maximum possible offset is imposed (i.e. ten units in only one dosha pan). Second, when the scale is set to reflect even the slightest immediate emotional imbalance (i.e. a cumulative score of 21 on any series of Section Two questions), the Slide-Weighting-System will offset the indicating rod from true north causing the pointer to rest outside the second circle, even when the maximum possible offset is imposed by the Pan-Weighting-System. Third, it shall not be possible for the scale to offset from true north so much so that the pointer rests outside the plate. This may be achieved by assuring that the maximum weighting and length of each component conform to its respective physical ratio with respect to this principle, by maximizing the offset using supporting rods, springs or catches, or by employing a combination of both strategies.

Operation—Usage

The user will review questions from Section One, above, and add one unit of measure to the relevant pan for each question answered affirmatively. For example, if Vata question number one is answered affirmatively, the user shall place one unit of measure (i.e. stone) in the Vata pan. After reviewing all questions from Section One, the user will observe his or her body score, as per the measurement section below. The user will then proceed to answer all questions from Section Two. He or she will appropriate from one to five points for each question—one representing "Not at all" and five representing "Very"—under each respective dosha. The user will move the appropriate arm's notch weight to reflect each dosha's cumulative score immediately after completing each segment of Section Two. The user will then observe the overall findings—which will either specify to the user his or her true body type or alert the user to immediate imbalances to which should be attended. The user then may wish to leave the scale in its current state of balance as a reminder to follow specific remedies advocated by Ayurveda until such time as a retest is taken.

Operation—Measurement

After the user takes each section test, as per above, he or she may observe their results by simply observing to what segment on the plate, out of a possible thirteen, the weighted indicator is pointing.

If the focus is anywhere inside the second circle, the indication is that the individual is in relative immediate balance and that the body type assessment can be reasonably relied upon. Moreover, the focus point will then indicate to the user his or her body type out of seven possibilities. If the focus is within the inner circle, the indication is that the user possesses a combined Vata-Pitta-Kapha body type. If the focus is on one of the three sections in alignment with an arm, the indication is that the user predominantly possesses that arm's designated dosha. If the focus is on one of the three remaining sections, the indication is that the user possesses a dual body type of either Vata-Pitta, Vata-Kapha, or Pitta-Kapha, depending upon between which arms the focus falls. If the focus is anywhere outside the second circle, the indication is that the individual is not in immediate balance. The imbalance can be specified by observing over which section, out of a possible six, the pointer rests. If the focus is on one of the three sections in alignment with an arm, the indication is that the user's respective dosha is out of balance. If the focus is elsewhere, the indication is that the user is significantly out of balance in more than one dosha, depending upon between which arms the focus falls. It should be noted that the Section Two questions possess an inherent mutual exclusivity that prohibit a maximum rating on each of the three sections, and thereby preclude the need for a fourteenth section, which would indicate an immediate, equal imbalance in all three doshas. The three figures below are illustrative of sample readings which yielded, from left to right, an assessment of a Vata-Pitta-Kapha body type and a state of current emotional balance, a Vata body type and a state of current emotional balance, and a state of imbalance relating to the Pitta and Kapha doshas, respectively.

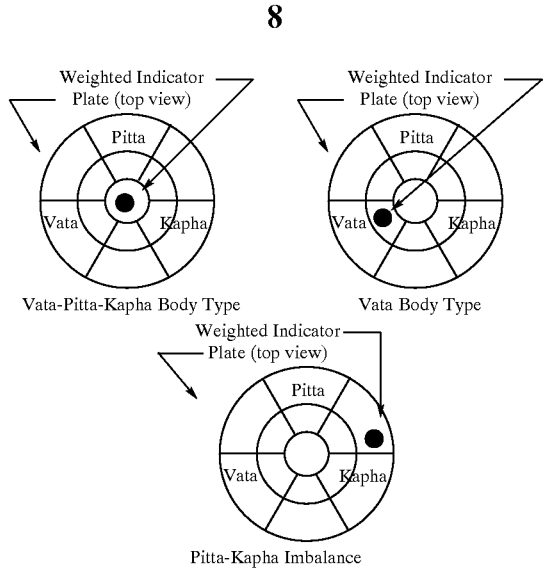

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A physical representation of the philosophical essence of the ancient science and philosophy of Ayurveda in the form of a tri-armed scale comprising:

a) a three-armed balance scale, which exhibits all three arms connected together at one end and on a common flat or conical plane so as to form three 120-degree angles and to be in perfect equilibrium with one another; and b) a structure that supports the three-armed mechanism at its fulcrum; and c) a measuring system that clearly defines the user's Ayurvedic emotional state and body type; and d) a weighting system that works in accordance with the measuring system to produce consistent, accurate results.

* * * * *